United States Patent
Barrett

(10) Patent No.: US 9,654,506 B2
(45) Date of Patent: May 16, 2017

(54) MANAGING AND ACCOUNTING FOR PRIVACY SETTINGS THROUGH TIERED COOKIE SET ACCESS

(71) Applicant: GLOBAL 9-TIMES-5, LLC, Potomac, MD (US)

(72) Inventor: Mary H. Barrett, Potomac, MD (US)

(*) Notice: Subject to any disclaimer, the term of this patent is extended or adjusted under 35 U.S.C. 154(b) by 0 days.

(21) Appl. No.: 14/211,345

(22) Filed: Mar. 14, 2014

(65) Prior Publication Data
US 2015/0026815 A1    Jan. 22, 2015

Related U.S. Application Data

(60) Provisional application No. 61/791,633, filed on Mar. 15, 2013.

(51) Int. Cl.
| | |
|---|---|
| *H04L 29/06* | (2006.01) |
| *G06F 21/60* | (2013.01) |
| *H04L 29/08* | (2006.01) |
| *G06F 21/00* | (2013.01) |
| *G06F 21/62* | (2013.01) |
| *G06Q 30/02* | (2012.01) |
| *G06Q 30/06* | (2012.01) |

(52) U.S. Cl.
CPC .............. *H04L 63/20* (2013.01); *G06F 21/00* (2013.01); *G06F 21/60* (2013.01); *G06F 21/6263* (2013.01); *G06Q 30/02* (2013.01); *G06Q 30/06* (2013.01); *H04L 67/22* (2013.01); *G06F 2221/2113* (2013.01)

(58) Field of Classification Search
CPC ......... H04L 63/20; H04L 67/22; G06F 21/60; G06F 3/048; G06F 21/6263; G06F 21/00; G06F 2221/2113; G06Q 30/06; G06Q 30/02

USPC .......................................................... 726/26
See application file for complete search history.

(56) References Cited

U.S. PATENT DOCUMENTS

| | | | |
|---|---|---|---|
| 2002/0029201 A1 | 3/2002 | Barzilai et al. | |
| 2003/0004898 A1 | 1/2003 | McAuliffe et al. | |
| 2003/0023451 A1 | 1/2003 | Willner et al. | |
| 2003/0088517 A1* | 5/2003 | Medoff .......................... | 705/59 |
| 2004/0139025 A1 | 7/2004 | Coleman | |

(Continued)

OTHER PUBLICATIONS

International Search Report; International Application No. PCT/US2014/028603; Filing Date: Mar. 14, 2014 (Form PCT/ISA/210).

*Primary Examiner* — Mahfuzur Rahman
*Assistant Examiner* — Nariciso Victoria
(74) *Attorney, Agent, or Firm* — Michael Best & Friedrich LLP

(57) ABSTRACT

Tiered management of privacy settings is disclosed. In one example, such management entails defining privacy tiers respectively corresponding to privacy levels. Cookies are then associated to the privacy tiers to accommodate the management of browsing activity according to the relevant tier. Additionally, different sets of private information are respectively associated to the privacy tiers. This provides for the management of browsing activity using the privacy tiers, the cookies and the different sets of private information. In this fashion, the association of a given cookie to a given privacy tier dictates a given set of private information to be provided to another party in connection with a given browsing activity.

18 Claims, 3 Drawing Sheets

(56) References Cited

U.S. PATENT DOCUMENTS

| | | | |
|---|---|---|---|
| 2005/0198031 A1* | 9/2005 | Pezaris et al. | 707/9 |
| 2006/0079249 A1 | 4/2006 | Shim | |
| 2006/0123462 A1 | 6/2006 | Lunt et al. | |
| 2012/0240050 A1 | 9/2012 | Goldfeder et al. | |
| 2012/0284801 A1 | 11/2012 | Goodwin et al. | |
| 2012/0317652 A1 | 12/2012 | Kiley et al. | |
| 2014/0143886 A1* | 5/2014 | Eversoll | G06F 21/60 726/27 |

* cited by examiner

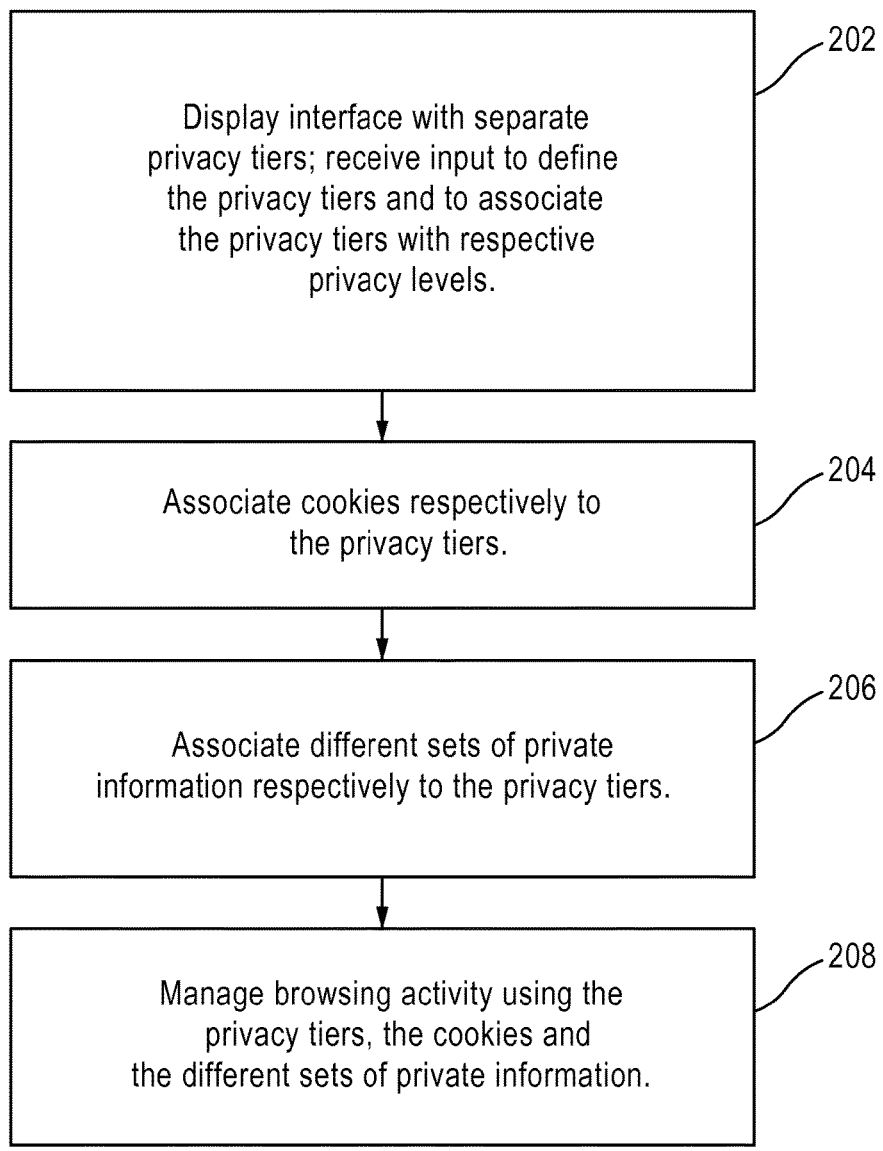

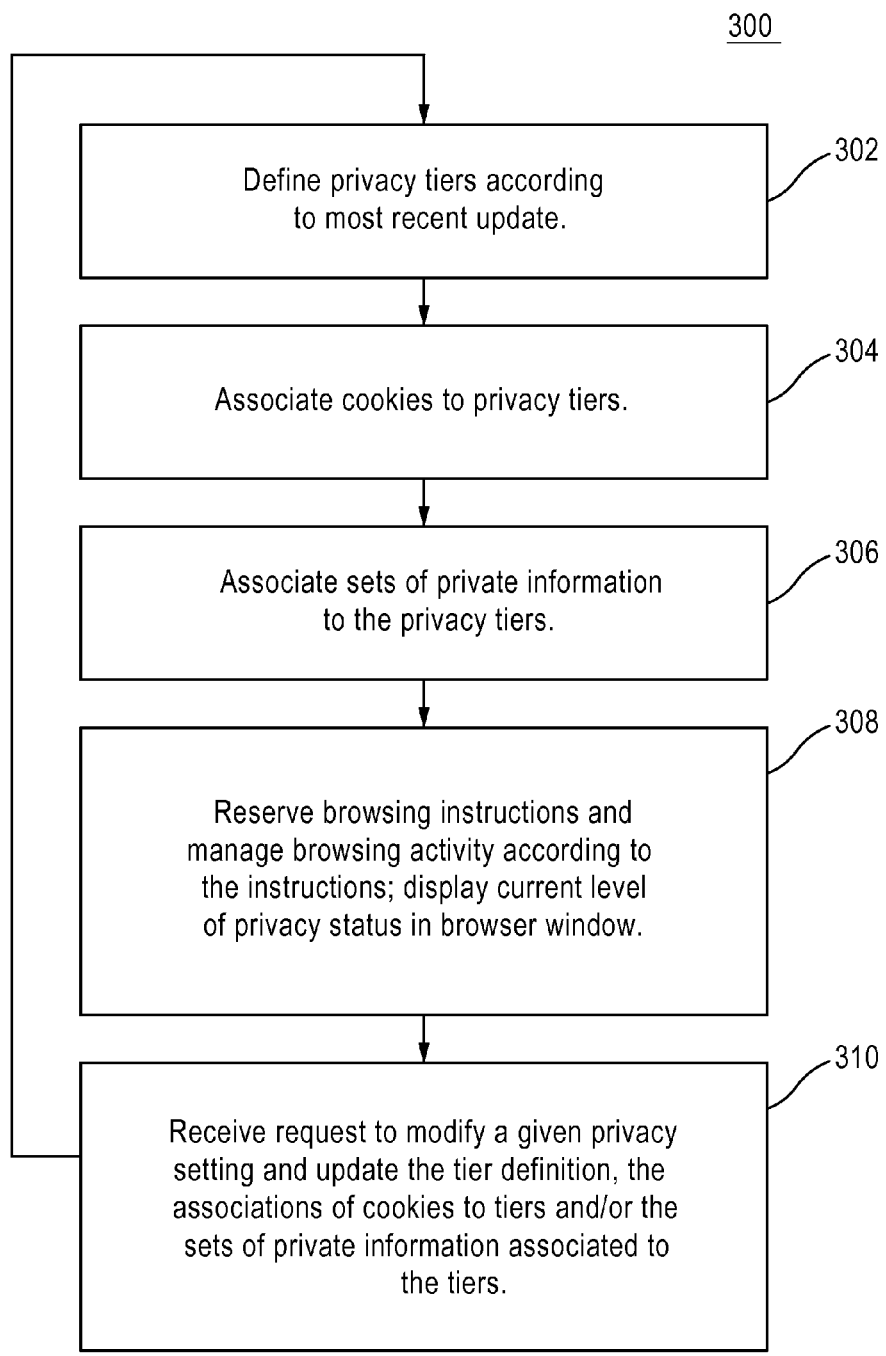

MANAGING AND ACCOUNTING FOR PRIVACY SETTINGS THROUGH TIERED COOKIE SET ACCESS

CROSS REFERENCE TO RELATED APPLICATIONS

This application claims priority to provisional App. Ser. No. 61/791,633 filed on Mar. 15, 2013 and entitled Managing and Accounting for Privacy Settings through Tiered Cookie Set Access, the entire contents of which are hereby incorporated by reference.

BACKGROUND OF THE INVENTION

1. Field of the Invention

The present disclosure relates to management of private information and more particularly to managing and accounting for privacy settings through tiered cookie set access.

2. Description of the Related Art

In conventional online activity, users have virtually no control over the provision of private information to other parties. This private information may be as simple as the browsing activity itself (e.g., tracking online activity). It may also involve additional information, such as a user's credit card information, banking information, and personal information such as birthdates, relationship status, social security numbers, etc.

What is needed is a greater ability to manage private information in connection with Internet browsing activity. The ability to observe and manage privacy settings in connection with various private information is also needed.

SUMMARY OF THE INVENTION

Tiered management of privacy settings is disclosed. In one example, such management entails defining privacy tiers respectively corresponding to privacy levels. Cookies are then associated to the privacy tiers to accommodate the management of browsing activity according to the relevant tier. Additionally, different sets of private information are respectively associated to the privacy tiers. This provides for the management of browsing activity using the privacy tiers, the cookies and the different sets of private information. In this fashion, the association of a given cookie to a given privacy tier dictates a given set of private information to be provided to another party in connection with a given browsing activity.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which:

FIG. 2 is a flow diagram illustrating an example of managing privacy settings.

FIG. 3 is a flow diagram illustrating another example of managing privacy settings.

DETAILED DESCRIPTION OF THE INVENTION

Figure 1:
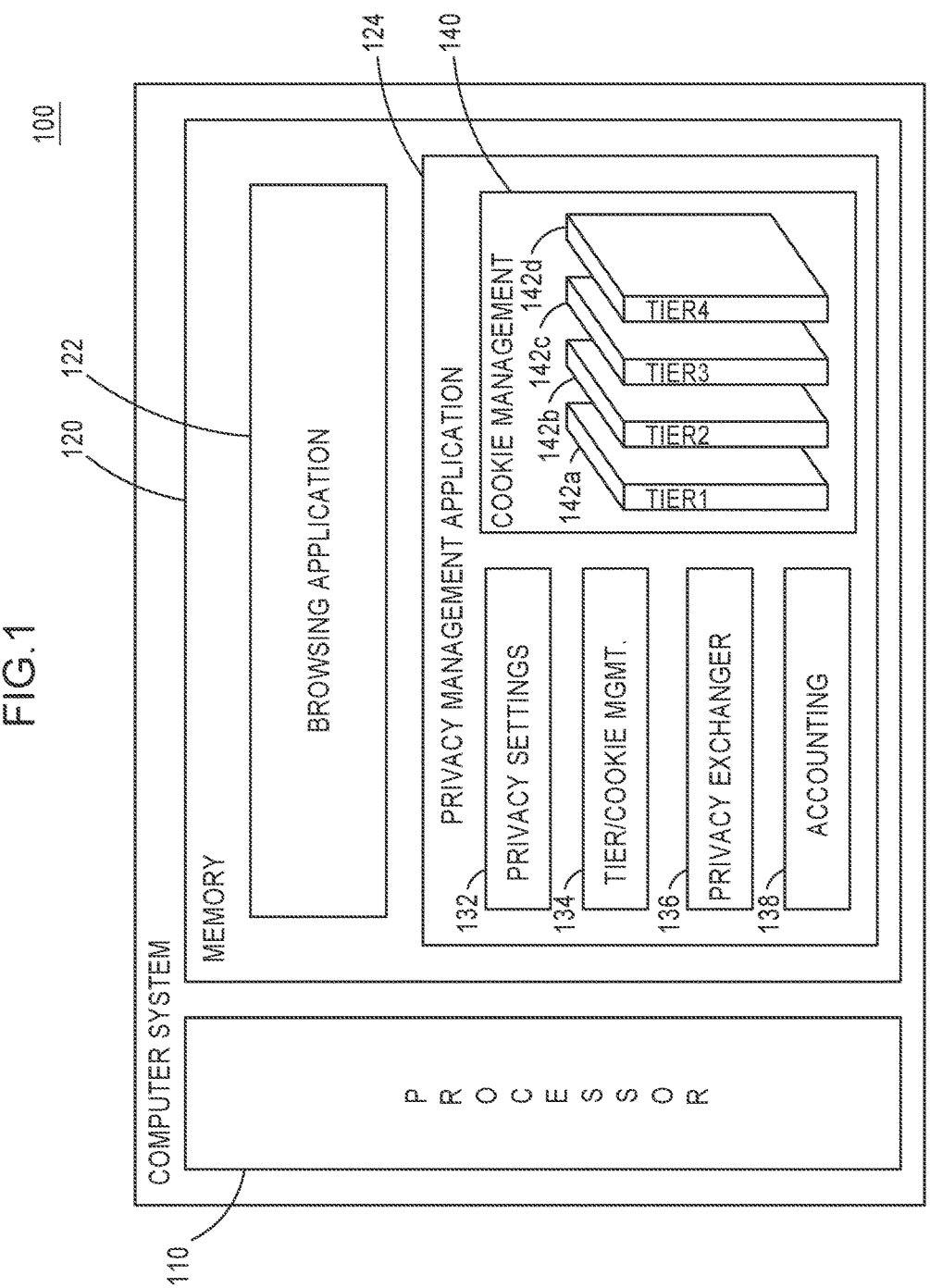
FIG. 1 is a block diagram illustrating an example of a system hosting a privacy management application.

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

FIG. 1 illustrates an example of a computer system 100 that includes a processor 110 and memory 120 that stores program code executable to provide the features of managing and accounting for privacy settings through tiered cookie set access.

The memory 120 is illustrated to use a conventional browsing application 122. The browsing application 122 is used to browse Internet resources via access to various websites. In conventional browsing, cookies are used to allow the browser/computer system to communicate information to websites, which provides authentication and identification of the browser pursuant to various efficiencies and conveniences, such as the provision of customized pages, avoidance of duplicate data entry, preferred presentation of materials, etc.

While these efficiencies and conveniences are beneficial to the user and the website, various privacy concerns can also arise through the pervasive use of cookie technology. For example, adware and spyware often use cookies to track web browsing activity, which may later be used to distribute information about the user's browsing activity. This and the related use of this information, whether for hacking, targeted advertising, data mining, or other reasons presents significant privacy exposure.

Traditionally, an "all or nothing" approach has generally been used with respect to cookies. That is, the browser 120 may be set to enable or disable cookies, so they are always accepted, or always rejected. Additionally, the cookies that have been accumulated may be viewed by the user, and managed individually, such as by deleting cookies that are not recognized. This provides some flexibility but clearly has disadvantages. First, most users are not aware of this capability, as it requires navigation among arcane browser features. Secondly, cookies are not always easy to identify. Sometimes a valuable cookie may have an unfamiliar name, and sometimes an undesirable cookie may have an innocent or misleading name. Thirdly, it is difficult and cumbersome to manage cookies in this fashion, since an abundance of cookies tend to accumulate with regular browsing.

The privacy management application 124 provides convenient, flexible and value-added cookie and privacy management.

The privacy management application 124 maintains privacy settings and facilitates the restriction of information according to tiered browsing. To accommodate this, the privacy management application 124 implements a tier/cookie management module 134 and a cookie management module 140 that respectively manage and provide tiered levels of cookie sets (e.g., Tier 1, Tier 2, Tier 3 and Tier 4, as shown in FIG. 1).

In a basic sense, this may be undertaken by restricting access to and generation of different sets of cookies as segregated by the tiers 142a-d. For example, if Tier 1 (142a) is representative of the most private browsing setting (other than total disable, which may be provided as Tier 0 in some embodiments), cookies may only be accessed and originated in connection with the set of cookies segregated as Tier 1.

Operation and access to cookie sets may be incremental. For example, a second level of browsing privacy may implement an additional set of cookies segregated as Tier 2 (142b), a third level of browsing activity may implement still another set of cookies segregated as Tier 3 (142c), and so on.

Alternatively, the cookie set may be managed in segregated fashion. That is, the selection of Tier 2 may limit access to only those cookies resident in Tier 2. This allows browsing to be managed such that the user represents as "Tier 1" when that tier is selected for browsing activities, but represents as "Tier 2" when that tier is selected for browsing activities.

The current level of privacy may be clearly conveyed to the user via a simple user interface, and may optionally be persistently displayed on the browser so that the user is clearly aware of the current level of the privacy settings. The interface is also configured to allow the user to easily change the current level of privacy settings. This provides a significant convenience and enhancement over the hodgepodge, hit-or-miss approach to current cookie management.

In addition to the convenience of cookie set management capabilities, an embodiment of the present invention may be used to manage access to cookie sets as well as privacy data, potentially in exchange for value.

A privacy settings module 132 stores user information and allows the user to separate and protect various data with respect to various levels of privacy settings. A privacy exchange module 136 manages and tracks access to various levels of access, preferably correlated with the same tier levels adopted for the cookie set management. A value accounting module 138 stores accumulated value resulting from the exchange of levels of privacy.

To explain, "Tier 0" (total cookie disable), "Tier 1" (first set of cookies accessible), "Tier 2" (second set of cookies also accessible), etc. may be correlated in discrete and convenient fashion to different levels of privacy. The privacy exchange module 136 may adopt this in conjunction with managing browsing activity and identifying opportunities for the user to select different privacy levels in exchange for value. For example, some websites may have an incentive to provide user compensation to users that agree to browse the website under low privacy settings. Thus, for example, if a user agrees to allow "Tier 4" browsing, the website may compensate the user with coupons, credits or other value. The incentive to the website may come from other parties. For example, marketing companies may compensate websites based upon the number of users that they develop under a desired tier (e.g., Tier 3 or higher). A Tier 3 or 4 user may be more valuable to the marketing company, since more rich information is presumably available for that user. Alternatively, the website itself may have an incentive to encourage lower-level tiers of privacy, if such information is independently valuable to the website.

In contrast to existing systems, where the user is mostly unaware about the collection of information, embodiments of the present invention allow the user to be fully aware and appreciative of the level of privacy as well as the corresponding value that can be accorded to that level of privacy. In connection with this, the current level of browsing activity is displayed, for example in the peripheral region of a browsing window. For example, text of graphics denoting "Tier X" are depicted in the peripheral region.

Finally, consistent with the management of privacy tiers as provided above the display ad model of "free" Internet browsing may be avoided while also resolving DRM issues of copyright management. For example, the management of the privacy tiers may incorporate a seeking-consent process that gives acknowledgement to an artist who filed for copyright protection. Another example includes giving payment or other value to copyright holder(s) with batch DRM clearinghouse functionality (per performance or by some flat rate arrangement).

The following three dynamics are also noted:

Firstly, instead of website owners and/or their agents (e.g., targeted traffic ad providers) secretly "recording" a surfer's private information and surfing behavior, preferences and purchasing history, etc., through the use of cookies (to manifest said data created in association with that surfer), then reselling said info for value accruing to the thief (or split among those "thieves") on that surfer's clickstream (as evidenced by the cookies that session), the improvement described herein is to make transparent that cookie-based data-recording activity; give its rightful owner control over it; then remunerate the surfer for intentionally allowing the "cookie-keeper" aka appointed guardian of private info to [re]sell said info in exchange for some value accruing back to the surfer.

Secondly, one type of value could be the privilege to view proprietary content, like watch normally pay-per-view sports for free, or allow the surfer to download a new hit song that normally would have to be purchased from iTunes. In order to give as consideration some content that is copyrighted to the surfer as a reward, another improvement is to incorporate into a business process a method of pre-established seeking of consent in order to make LEGAL the retransmission of that copyrighted content.

Thus, by some preferred method between cookie-keeper/privacy tiers operator and content provider ((e.g., the artists, or the copyright clearinghouse or the sponsor/team of NFL, etc., or the agent/network etc. which acts as distributor of the commercially-valuable content), the application described herein provides for a monetization (paying for the costs of running a website plus delivery of some content to value) of the website and its activities including the normally-paid for content by the exchange of the privacy tiers surfer's information rather than by the traditional display ad model.

Accordingly, the surfer gets remunerated for allowing the cookie-keeper to sell his private information. That reward could be normally paid-for online content, coupons, virtual currency, cash (in some redeemable form), etc.

Thirdly, by dint of social media, as the hi-tech method of spreading traditional word-of-mouth recommendations also can create an "income/reward/etc. stream" to the surfer. In this case, the cookie-keeper is not directly benefiting by receiving monetary or other valuable consideration from those who buy the surfers', but indirectly: that is, if surfers' referrals generate leads that result in completed financial transactions, the cookie-keeper business as a whole grows logarithmically as the volume of referrals increase; as well as an additional reward opportunity for surfer; creating a positive feedback of increasing business activity for the benefit of all parties.

In so doing, the entire global industry of display ads to support creative content is no longer necessary.

FIG. 2 is a flow chart illustrating an example of a process 200 for managing privacy settings and information.

A user interface is displayed 202 to convey the various privacy tiers. For example, the interface may include respective rectangular regions for each of the privacy tiers being managed. The interface is configured to receive input that is used to manage the delineation of the privacy tiers (i.e., how many tiers, what they are named). The interface is also configured to manage the membership of the respective privacy tiers. Such membership management may correspond to the cookies that should belong to corresponding privacy tiers, as well the information sets that belong to the corresponding privacy tiers.

In one example of the association of cookies, the interface may display the regions respectively corresponding to each privacy tier, and within the respective regions indicators (text or graphics) indicative of the cookies that reside within the given privacy tier. The interface is configured so that the user may drag and drop a cookie into a desired privacy tier. Cookies may also be made members of multiple tiers, if desired. In that example, a copy mode is activated in connection with the drag and drop operation. In this fashion, the user may visually inspect which browsing activity will be associated to which tier. In addition to cookies, URL information may be used to organize the association of websites to corresponding privacy tiers. This similarly allows the user to control which websites should be correlated to which privacy tiers.

In an example of the association of different sets of private information, there is a set of interfaces corresponding to the sets of private information. These interfaces may similar include regions (e.g., rectangular, circular, etc.) that respectively correspond to the privacy tiers. Within the regions, graphical and textual displays accommodate the identification of the sets of information. For example, the highest privacy tier (e.g., Tier 1) may show within the relevant ("Tier 1") region an indication that social security number, date of birth, home address are members of that privacy tier. A next highest privacy tier (Tier 2) might show within the relevant region items such as business address, relationship status, etc. A still lower privacy tier (Tier 3) might be populated with information such as name, recent purchase information, fantasy league memberships, etc.; and yet another lower privacy tier (Tier 4) might be populated with more general information such as "browsing activity". The user may similarly manage the membership of the tiers by operations such as drag and drop (e.g., to move already-defined information among the tiers) or through data entry (e.g., to create a new class of private information).

In conjunction with these interfaces, the application associates 204 cookies respectively to the privacy tiers, and associates 206 different sets of private information respectively to the defined privacy tiers.

Thereafter, when the user is browsing the Internet, the application remains in control of the private information that is made available to the website and/or third party sites during such browsing activities. Specifically, the application manages the browsing activity using the privacy tiers, the cookies and the different sets of private information. In this fashion, the association of a given cookie to a given privacy tier dictates that a corresponding given set of private information is potentially accessible by or provided to another party (e.g., the website or a third party information recipient) in connection with the given browsing activity.

FIG. 3 illustrates an example of a process 300 for managing privacy settings that similarly includes defining 302 privacy tiers, with accommodation of updating the privacy tiers. Cookies and sets of private information are similarly associated 304, 306 to the privacy tiers.

When browsing instructions are received 308, the application manages the corresponding browsing activity according to the browsing instructions and the above-described privacy settings (tiers, cookies and/or URLs, sets of private information). In conjunction with this, an indicator is provided in connection with the browsing activity, so that the user is readily made aware of the privacy status of a current browsing activity.

In one example, a simple graphic or text is provided in the periphery of the browsing window to indicate the current state (e.g., Tier 1, or Tier 2, etc.). The "current state" may be dictated by the website currently being navigated in the browser. That is, if the user has designated "Website A" as a "Tier 3" designated site, then "Tier 3" appears in the window.

Alternatively, the current state may be dictated by the user. For example, the user may be in the mood for browsing under total privacy. In this case, the user may select the highest available tier and may also indicate that such a tier be used regardless of the existing relationship (cookie/site-to-tier) settings as described above.

The indicator does not need to be text-based. In one alternative, the frame of the browsing window may change colors according to the current setting. For example, under a relaxed setting, where information is being freely provided or is freely accessible, the frame may be bright red to indicate the risk to the user. By contrast, a strict setting, where little or no information is being made available, the frame may be green to indicate that the user may proceed freely without concern of losing control of private information. Intermediate states might warrant a yellow frame color.

Browsing may thus continue accordingly. According to another aspect of this disclosure, the user may freely make modification of the privacy settings for application to subsequent browsing activity. In this regard, the application receives 310 the request to modify a given privacy setting, and then updates the tier definition(s), the association of cookie(s) to the tier(s) and/or the set(s) of private information associated to the tiers as described in detail above.

Once the request to update is completed, the relevant settings are adjusted and browsing may continue according to the updated settings.

Thus embodiments of the present invention produce and provide managing and accounting for privacy settings through tiered cookie set access. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for tiered management of privacy settings for a user of a computing device, the method comprising:
receiving input from the user of the computing device to define privacy tiers respectively corresponding to privacy levels;
automatically associating, by the computing device, cookies to respective privacy tiers, the cookies being resident on the computing device as a result of existing browsing activity of the computing device;
associating different sets of private information of the user to the respective privacy tiers; and
automatically managing additional browsing activity of the computing device using the cookies, the respective privacy tiers associated to the cookies, and the different sets of private information, wherein the associations of the cookies to the respective privacy tiers dictate provision of the different sets of private information to respective other parties in connection with the additional browsing activity, and wherein different values are automatically accorded to the user in exchange for the respective provision of the different sets of private information to the respective other parties.

2. The method according to claim 1, further comprising: displaying a current level of privacy status during a given browsing activity, the current level of privacy status indicating one of the privacy tiers.

3. The method according to claim 1, further comprising: managing an accounting of the different values that are accorded to the user.

4. The method according to claim 1, further comprising: displaying an interface to receive modification of privacy tier settings.

5. The method according to claim 1, further comprising: receiving a request to modify a setting corresponding to a given privacy tier; and
updating the given privacy tier according to the request.

6. The method of claim 5, wherein updating the given privacy tier comprises identifying a given cookie corresponding to a given browsing activity, and moving the given cookie from a first privacy tier to a second privacy tier in connection with the request.

7. A non-transitory computer readable medium storing program code for tiered management of privacy settings for a user of a computing device, the program code comprising:
instructions for receiving input from the user of the computing device for defining privacy tiers respectively corresponding to privacy levels;
instructions for automatically associating, by the computing device, cookies to respective privacy tiers, the cookies being resident on the computing device as a result of existing browsing activity of the computing device;
instructions for associating different sets of private information of the user to the respective privacy tiers; and
instructions for automatically managing additional browsing activity of the computing device using the cookies, the respective privacy tiers associated to the cookies, and the different sets of private information, wherein the associations of the cookies to the respective privacy tiers dictate provision of the different sets of private information to respective other parties in connection with the additional browsing activity, and wherein different values are automatically accorded to the user in exchange for the respective provision of the different sets of private information to the respective other parties.

8. The computer readable medium according to claim 7, further comprising:
instructions for displaying a current level of privacy status during a given browsing activity, the current level of privacy status indicating one of the privacy tiers.

9. The computer readable medium according to claim 7, further comprising:
instructions for managing an accounting of the different values that are accorded to the user.

10. The computer readable medium according to claim 7, further comprising:
instructions for displaying an interface to receive modification of privacy tier settings.

11. The computer readable medium according to claim 7, further comprising:
instructions for receiving a request to modify a setting corresponding to a given privacy tier; and
instructions for updating the given privacy tier according to the request.

12. The computer readable medium according to claim 11, wherein updating the given privacy tier comprises identifying a given cookie corresponding to a given browsing activity, and moving the given cookie from a first privacy tier to a second privacy tier in connection with the request.

13. An apparatus for tiered management of privacy settings, the apparatus comprising: a processor; and
a memory, the memory storing program code executable by the processor to perform operations comprising:
receiving input from the user of the computing device to define privacy tiers respectively corresponding to privacy levels;
automatically associating, by the computing device, cookies to respective privacy tiers, the cookies being resident on the computing device as a result of existing browsing activity of the computing device;
associating different sets of private information of the user to the respective privacy tiers; and
automatically managing additional browsing activity of the computing device using the cookies, the respective privacy tiers associated to the cookies, and the different sets of private information, wherein the associations of the cookies to the respective privacy tiers dictate provision of the different sets of private information to respective other parties in connection with the additional browsing activity, and wherein different values are automatically accorded to the user in exchange for the respective provision of the different sets of private information to the respective other parties.

14. The apparatus according to claim 13, wherein the operations further comprise:
displaying a current level of privacy status during a given browsing activity, the current level of privacy status indicating one of the privacy tiers.

15. The apparatus according to claim 13, wherein the operations further comprise:
managing an accounting of the different values that are accorded to the user.

16. The apparatus according to claim 13, wherein the operations further comprise:
displaying an interface to receive modification of privacy tier settings.

17. The apparatus according to claim 13, wherein the operations further comprise:
receiving a request to modify a setting corresponding to a given privacy tier; and
updating the given privacy tier according to the request.

18. The apparatus according to claim 17, wherein updating the given privacy tier comprises identifying a given cookie corresponding to a given browsing activity, and moving the given cookie from a first privacy tier to a second privacy tier in connection with the request.

* * * * *